RAMP-CONTROLLED SELECTION CIRCUIT FOR SIMULTANEOUSLY ENABLED NEGATIVE RESISTANCE DEVICES
Filed Aug. 23, 1965
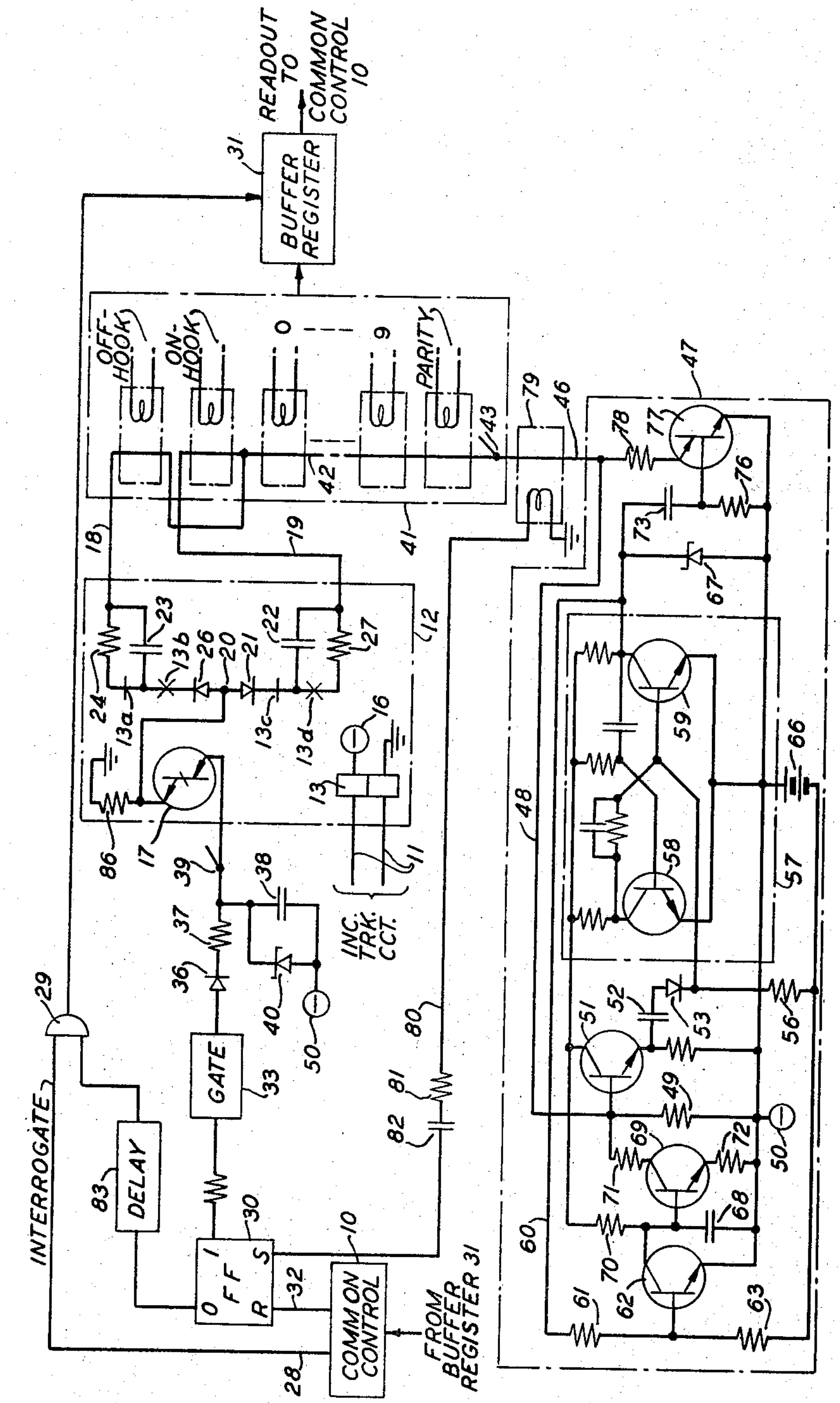
INVENTORS M. L. EMBREE
A. V. HAAG
D. VEDDER
BY Charles Scott Phelan
ATTORNEY United States Patent Office 3,421,030
Patented Jan. 7, 1969

3,421,030

RAMP-CONTROLLED SELECTION CIRCUIT FOR SIMULTANEOUSLY ENABLED NEGATIVE RESISTANCE DEVICES

Milton L. Embree, Laureldale, Pa., and Arthur V. Haag and Dietrich Vedder, Columbus, Ohio, assignors to Bell Telephone Laboratories, Incorporated, New York, N.Y., a corporation of New York Filed Aug. 23, 1965, Ser. No. 481,831
U.S. Cl. 307—324 5 Claims
Int. Cl. H03k 3/26; 19/08; 19/12; 23/14

This invention relates to a selection circuit for negative resistance devices and more particularly it relates to such a selection circuit which employs a ramp circuit to control the device selection.

Typically, negative resistance devices of the two-electrode type are driven into conduction by the application thereto of a potential difference in the forward direction and of a magnitude which is at least equal to the forward breakdown, or breakover, voltage of the device. Once conduction begins the device passes through an unstable negative resistance region of its characteristic and ultimately rests in a stable conducting condition with a diode potential difference which is much smaller than the aforementioned breakdown voltage. In the latter stable condition the device conducts as long as a relatively small minimum sustaining current is available. It also can conduct much larger currents with substantially no change for practical purposes from the aforementioned low potential difference.

A PNPN semiconductor device is a typical negative resistance diode of the type just described. This semiconductor device may have a forward breakdown voltage in the range of 17 to 25 volts, and the range of sustaining currents for such a diode type extends from about four milliamperes to about thirty milliamperes.

The copending application of A. V. Haag and D. Vedder, S.N. 481,832, which was filed on Aug. 23, 1965, and entitled "Selection Circuit for Simultaneously Enabled Negative Resistance Devices," discloses and claims a selection circuit which is adapted to select for operation a single one of a plurality of negative resistance devices. In the Haag et al. system a plurality of negative resistance devices are simultaneously enabled for conduction by having applied thereto a voltage which has a maximum value that is at least equal to the forward breakdown voltage of the diode with the largest breakdown voltage. One of those voltage-enabled diodes is then selected for operation by limiting the maximum current which is available to all the diodes to a level which is adequate to sustain conduction in only one diode. The group of enabled diodes then race among themselves to seize control of the one sustaining current and thereby lock out the other enabled diodes. It can be shown that at least for one embodiment of the Haag et al. selection circuit it is helpful to restrict the diodes among which a selection is made to those having a sustaining current range in which the maximum sustaining current for any one diode is less than twice the lowest sustaining current of any one of the diodes. This is necessary in order to avoid the possibility of more than one of the diodes being biased into stable conduction at the same time.

However, in the present state of the art the PNPN diodes in any group, selected at random from a typical batch, may have a range of sustaining currents in which the maximum is approximately eight times larger than the minimum. Thus, in order to operate a system in which diode selection is accomplished, as in the aforementioned Haag et al. application, it is necessary to select diodes having sustaining currents within the aforementioned range of two to one. Such circuit element selections involve a significant extra cost and impose a rather severe restriction upon replacement parts that must be carried in inventory at any one location.

It is, therefore, one object of the invention to improve negative resistance device selection circuits.

It is another object to increase the range of sustaining current characteristics that can be accommodated in a single selection circuit for simultaneously enabled negative resistance devices.

These and other objects of the invention are realized by employing a ramp circuit for automatically varying the amount of current which is available to a plurality of simultaneously enabled diodes in a diode selection circuit. The range of operation of the ramp circuit extends from the lowest sustaining current of any of the devices to the highest sustaining current of any of the remaining devices. Consequently, the one device with the lowest sustaining current in a group of simultaneously enabled devices seizes control of the available current, and it thereafter locks out the other enabled devices even though greater amounts of sustaining current may subsequently be available.

It is one feature of the invention that the sustaining current range for negative resistance devices accommodated by the invention includes devices with sustaining currents that can be more than twice the size of the sustaining current of a different device also accommodated by the selection circuit.

Another feature is that the initiation of current flow through any of a plurality of voltage-enabled negative resistance devices triggers a voltage ramp circuit which, in turn, triggers a current ramp circuit that is utilized to control the resistance in a common circuit path for all of the enabled devices.

A more complete understanding of the invention may be derived from a consideration of the following detailed description when taken together with the appended claims and the attached single figure of the drawing which includes a diagram, partially in block and line form and partially in schematic form, of a negative resistance device selection circuit in accordance with the invention. The invention is herein described and illustrated in its application to a line concentrator of the type taught in the aforementioned Haag et al. application. However, it is to be understood that the invention is not so limited.

In the drawing the invention is shown in a program-controlled telephone central office. A common control 10 is programmed to operate the central office equipment and, at regular intervals in its program, to initiate a scanning operation to look for changes in the electric signal state of a plurality of circuit points. One set of such points would be a plurality of incoming trunk circuits; and one such circuit, the incoming trunk 11, is illustrated in the drawing. Although the invention is utilized in such an office in connection with a plurality of such trunk circuits, only one is shown because the associated circuitry for that one is the same as for all the other circuits. During the scanning operation initiated by common control 10 all of the trunk circuits, such as trunk 11, are simultaneously checked for a change in signal condition in the manner outlined in the aforementioned Haag et al. application. The group of trunks is repeatedly checked during the same scanning operation until each of the trunk circuits which has experienced a supervisory signal change and is awaiting service has been accommodated by suitable operation of the common control 10. The common control thereafter resumes its regular program until in such program routine it comes back once again to initiate a new scanning operation to look for further changes.

Each trunk circuit 11 is associated with a trunk diode circuit 12 that includes a two-winding relay 13. A signal condition corresponding to a contact closure on the trunk circuit 11 completes a series energizing circuit for the two sides of the relay 13. Such a path extends from a negative potential source 16 through the upper winding of relay 13, the two conductors of trunk circuit 11 including closed contacts, not shown, in another telephone central office, and through the lower winding of relay 13 to ground. The source 16 is indicated as a circled polarity sign at the indicated circuit location which schematically represents a suitable source of direct potential having its terminal of indicated plurality connected to such circuit point and having a terminal of the opposite polarity connected to ground.

Relay 13 operates its contacts 13*a* through 13*d* for controlling the connection of a negative resistance device, such as the PNPN diode 17, to a pair of branch circuits 18 and 19. When relay 13 is in its released condition, diode 17 is connected through a common circuit junction 20, a diode 21, the normally closed contacts 13*c* and a capacitor 22 in the branch circuit 19. Under the same conditions, branch circuit 18 is disconnected from diode 17, and a capacitor 23 in that branch circuit is connected through the normally closed contacts 13*a* to a resistor 24 for dissipating any charge on the capacitor. In this state of the circuit the diode 17 can conduct under conditions which will be hereinafter discussed for charging the capacitor 22.

When relay 13 is energized by the aforementioned contact closure on the trunk circuit 11, the conditions of the branch circuits 18 and 19 are reversed. The branch circuit 18 is connected to diode 17 through a diode 26, normally open contacts 13*b*, and capacitor 23. Similarly at this time, normally closed contacts 13*c* are opened, and the contacts 13*d* are closed so that the capacitor 22 discharges through a resistor 27.

At the beginning of a scanning operation initiated by common control 10, a first interrogation signal is coupled by a lead 28 to one input of a coincidence gate 29. The latter gate had been enabled by the binary ZERO output of a bistable multivibrator 30, i.e., a flip-flop circuit. The output of gate 29 at this time triggers a buffer register 31 to cause such register to read out to the common control 10 any information that had been stored therein subsequent to the end of the previous scanning operation.

After the end of the read-out to common control 10 a reset signal is applied on a lead 32 to reset the flip-flop circuit 30. The positive binary ONE output of the flip-flop circuit, when reset, actuates a current gate amplifier 33 to produce a current pulse of substantial magnitude. The output pulse from gate 33 is coupled through a blocking diode 36 and a resistor 37 to charge an integrating capacitor 38. The same signal is also applied through a common circuit junction 39 to the diodes 17 in all of the trunk diode circuits 12. Additional circuits 12, which are not shown, are schematically represented by the diagonal line circuit junction 39.

Assume that just prior to the scanning operation a plurality of trunk diode circuits 12 had been partially enabled by changes in the conditions of their respective relays 13 so that a discharged branch circuit capacitor is coupled to the diode 17 in each one of the circuits 12. Let it be assumed, for example, that relay 13 has just been released so that the discharged capacitor 22 is connected to the diode 17, and that diode is thus partially enabled. When the charge potential on capacitor 38 attains a sufficient magnitude, limited by a reverse breakdown diode 40, diode 17 is fully enabled because the net potential difference between its two electrodes is at least equal to its forward breakdown voltage. A similar condition prevails at each of the other diodes 17 which were also enabled as aforesaid. However, none of the diodes which are thus enabled from a voltage standpoint has sufficient current available to it to meet its sustaining current requirements.

All of the enabled diodes 17 are coupled through one of their branch circuits to an encoder 41; and within the encoder each such diodes is coupled through a different circuit 42, which is individual to that diode, to a common circuit junction 43. The encoder 41 includes a plurality of transformer cores for coupling signal variations on the various circuits 42 to the buffer register 31. Each of the circuits 42 links the cores of the encoder in a different combination so that the read-out to the buffer register is unique for any one of the circuits 42. Such read-out identifies a particular one of the trunk circuits 11 which has been subjected to a change in signal condition. Details of the operation of the encoder 41 are set forth in the aforementioned Haag et al. application.

Circuit junction 43 is coupled through a lead 46 to a current control circuit 47 which exercises a variable control over the amount of current that is available to the diodes 17. Initially a small amount of current from all of the simultaneously enabled diodes flows through their respective circuits 42 in the encoder, but the individual current magnitudes are so small that the signals coupled to the register 31 are unable to produce a registration therein. These small currents combine and flow through the lead 46, a lead 48 in the current control circuit 47, and a resistor 49 to a source 50 of negative potential. The source 50 also has its negative terminal connected to the capacitor 38. The combined current returns through such capacitor and the junction 39 back to the diode 17 in each of the enabled trunk diode circuits 12.

Resistor 49 has a resistance magnitude which limits the mentioned combined current to a level which is approximately at the sustaining current level of the one of the diodes 17 having the lowest sustaining current requirements. Consequently, insufficient current flows at this time to permit sustained conduction in any one of the enabled PNPN diodes. Each of the diodes, as a result, initially conducts a small current in its unstable condition and then lapses back into a nonconducting state for lack of adequate sustaining current. It thereupon immediately is forward biased again at the breakdown voltage and tries to conduct once more. This operation repeats among the various enabled diodes until one is able to seize control of current at least equal to its sustaining current in a manner which will be described.

The initial small current flowing in the resistor 49 in current control circuit 47 develops a potential difference which biases a transistor 51 in an emitter follower circuit into conduction. The positive-going output of the emitter follower is coupled through a differentiating circuit for positive-going signals, which circuit includes a capacitor 52, a diode 53, and a shunt-connected resistor 56. The positive-going differentiated spike is utilized to trigger a conventional monopulser circuit 57 which includes two transistors 58 and 59 connected in a monostable multivibrator circuit. Monopulser 57 is arranged so that the transistor 59 is normally biased in a nonconducting condition when the monopulser rests in its stable state.

Prior to the triggering of monopulser 57, the ground output at the collector electrode of transistor 59 is coupled by a lead 60 and a resistor 61 to the base electrode of a transistor 62. That same base electrode is also connected through a resistor 63, a battery 66 and a reverse breakdown diode 67 to the collector electrode of the transistor 59. Diode 67 is included to limit the collector potential of transistor 59 and prevent the application of an excessive reverse potential to the base-emitter junction of transistor 58 when transistor 59 turns on. Battery 66 is poled to provide a small negative bias to the base electrodes of transistors 59 and 62. Resistors 61 and 63 comprise a potential divider which controls the potential at the base electrode of transistor 62.

Just prior to the triggering of the monopulser 57, the transistor 59 thereof is in its nonconducting condition; and the collector electrode of that transistor is at ground potential. Since resistor 61 is somewhat smaller than the transistor 62, the base electrode of resistor 63 is positive with respect to its emitter electrode; and the transistor 62 is in a conducting condition.

A capacitor 68 is connected between the collector and emitter electrodes of the transistor 62 and is short-circuited by such transistor in the ON state. Consequently, the negative potential of source 50 appears at the base electrode of transistor 69 so that this transistor is biased in a nonconducting condition. Resistor 49 is then the only resistor in control circuit 47 which can affect current in circuit 46 prior to the triggering of monopulser 57.

Upon the triggering of the monopulser 57, transistor 59 conducts and clamps its collector electrode at the negative potential source 50. A much smaller voltage is now imposed on the potential divider resistors 61 and 63. Accordingly, a potential appears at the base electrode of transistor 62 which is more negative than the potential of the source 50 and transistor 62 is thereby biased into a nonconducting condition. Capacitor 68 immediately begins to operate as a ramp voltage generator and charges from ground through a resistor 70 and to the source 50.

The rising potential at the base electrode of transistor 69 makes that electrode increasingly positive with respect to the emitter electrode thereof thereby biasing the transistor into conduction as a current ramp generator. Conduction in transistor 69 places the series combination of a resistor 71, the collector-emitter circuit of transistor 69, and a resistor 72 in parallel with the current limiting resistor 49. The changing conduction level in transistor 69 effects an increase in the total current that must be supplied through junction 39 and thus causes an increase in the current which is available to the enabled diodes 17. This increase continues as charge is accumulated on capacitor 68 in a voltage ramp circuit to change the current drawn by the current ramp circuit including transistor 69.

As the ramp begins, insufficient current is available to hold any one diode in conduction; and none of the enabled diodes is able to achieve stable conduction. The enabled diodes operate as part of what might be characterized as relaxation oscillators as they make repeated attempts to turn on. Eventually sufficient current is available to hold one of the diodes 17 in stable conduction. When this occurs, the relatively small net potential difference appearing between the common circuit junctions 39 and 43 as a result of such stable conduction locks out the other enabled diodes, and they return to stable nonconducting conditions.

It might be noted with respect to the aforementioned relaxation type of oscillator operation that the diodes do not turn off completely since a few microseconds are required at the time of an attempted turn off to clear the diodes of charge carriers. The fact that the diode is not completely turned OFF when additional breakover occurs has the effect of lowering the breakover voltage. As the oscillations proceed, the current ramp generator provides additional current and breakover occurs at successively lower voltages until one diode is enabled to remain in conduction and control the lockout.

Subsequently monopulser 57 times out and returns to its stable condition with transistor 59 turned OFF. The resulting positive-going potential at the collector electrode of that transistor is coupled back to the base electrode of transistor 62 to terminate the ramp, and it is also coupled through a capacitor 73 and a leakage resistor 76 to the control electrode of a triode PNPN switch 77. This signal biases switch 77 into conduction in series with a small resistor 78.

Resistor 78 is much smaller than the resistor 49 and permits a large current pulse to flow through the one diode 17 remaining in control. This large current pulse is coupled through the encoder 41 to activate buffer register 31. The pulse also is coupled through a trigger core 79 to produce a signal on a lead 80. The latter signal is coupled through a resistor 81 and a capacitor 82 for setting the flip-flop circuit 30. That setting operation disables gate 33 and terminates the charging of capacitor 38 so that diode 17 is biased back to its nonconducting condition for lack of sustaining current when approximately half of the charge from capacitor 38 has been transferred to the branch circuit capacitor 22 of the circuit 12.

The setting of flip-flop circuit 30 produces a signal at the binary ZERO output thereof, and that signal is coupled through a delay circuit 83 to enable the gate 29. Subsequently, common control circuit 10 generates a further interrogation signal which is coupled through the gate 29 to read out buffer circuit 29, all as described in the aforementioned Haag et al. application. The charge in capacitor 22 remains at substantially the level attained when diode 17 was biased off, and any spurious leakage from the capacitor is replaced by charging through a trickle charging path including a high resistance resistor 86.

Thus, the ramp control of the current control circuit 47 enabled rapid selection of one of a plurality of enabled diodes 17. The ramp in a typical circuit was advantageously operated at a rate of about one milliampere per microsecond so that it easily covered the typical range of diode sustaining currents in about 35 microseconds. That is about the same time usually allowed for selecting one diode from a group of enabled diodes with selected sustaining current characteristics by the techniques of the Haag et al. application.

If two diodes are enabled at the same time, it is obvious that the one with the lower sustaining current requirements will control in any event. However, if they have nearly equal sustaining currents, which are substantially above the available current, both diodes will go OFF after being enabled. If they have approximately equal sustaining currents slightly below the available current, one diode will ultimately control in the manner described herein and produce the desired circuit operation.

Although the present invention has been described with reference to a particular embodiment thereof, it is to be understood that additional embodiments, which will be apparent to those skilled in the art, are included within the spirit and scope of the invention.

What is claimed is:

1. In a circuit for controlling the current in plural impedance devices, said devices having a predetermined range of sustaining current requirements, each of said devices lapsing into a nonconducting condition when its current falls below its individual sustaining current level, means enabling a plurality of said devices for the conduction of current, means controllably limiting the magnitude of the total current in said enabled devices, a timing circuit, means responsive to the initial flow of current in said limiting means and in said enabled devices actuating said timing circuit, and means coupling said timing circuit to variably control the operating level of said limiting means as a function of time to limit said total current continuously through a range including a level below the lowest level of said predetermined range and a level at least equal to the highest level of such range.

2. The control circuit in accordance with claim 1 in which means are provided and coupled to said timing circuit for automatically terminating the adjustment of said limiting means after a predetermined time interval.

3. The control circuit in accordance with claim 1 in which said timing circuit is a monopulser triggered by said actuating means, and said control means includes a voltage generator coupled to the output of said monopulser for generating a ramp voltage signal, and an adjustable current generator coupled to the output of said voltage generator for controlling said limiting means.

4. The control circuit in accordance with claim 3 in which said limiting means comprises a resistor connected in series in a common circuit path for all of said devices, said resistor having a resistance level adapted to limit current through said devices to a level which is lower than the smallest sustaining current requirement of any of said devices, and means coupling said current generator to shunt said resistor for drawing additional current from said enabling means to vary the total current in said common circuit path between the last-mentioned level and a level above the highest sustaining current requirement of any of said devices.

5. In combination, a plurality of negative resistance devices, each of said devices being adapted to be enabled for conduction by the application of a predetermined voltage thereto but requiring a predetermined sustaining current to maintain stable conduction therein, the various sustaining currents for said devices representing a range in which the largest current is more than twice the size of the smallest current, means simultaneously enabling all of said devices for conduction, a common circuit path for all of said devices, means in said common path limiting the current therein, and said limiting means being responsive to the initiation of current flow in said path for adjusting the current through said range from said smallest current.

References Cited

UNITED STATES PATENTS 3,135,898 6/1964 Manganelli ---------- 315—323

OTHER REFERENCES

Electronic Industries and Tele-Tech, August 1957, "The Four-Layer Diode," pp. 58–60.

JOHN S. HEYMAN, *Primary Examiner.*

HAROLD DIXON, *Assistant Examiner.*